(12) United States Patent
Kruegel et al.

(10) Patent No.: US 7,435,180 B2
(45) Date of Patent: Oct. 14, 2008

(54) THRUST REVERSER ACTUATOR SYSTEM FLEX SHAFT ASSEMBLY

(75) Inventors: Roy F. Kruegel, Laveen, AZ (US); Michael J. Calmelat, Chandler, AZ (US); Chris L. Schlarman, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 567 days.

(21) Appl. No.: 11/032,340

(22) Filed: Jan. 10, 2005

(65) Prior Publication Data

US 2006/0150613 A1    Jul. 13, 2006

(51) Int. Cl.
    *F16C 1/08* (2006.01)
(52) U.S. Cl. ........................ 464/52; 60/226.2
(58) Field of Classification Search .......... 464/51–53, 464/182, 902; 74/500.5, 502.6; 403/293, 403/383; 60/226.2
See application file for complete search history.

(56) References Cited

U.S. PATENT DOCUMENTS

| | | | |
|---|---|---|---|
| 3,250,088 A * | 5/1966 | Hanebuth | ................. 464/53 |
| 3,973,411 A | 8/1976 | Stuemky | |
| 4,053,247 A | 10/1977 | Marsh, Jr. | |
| 4,269,438 A | 5/1981 | Ridenour | |
| 4,793,040 A | 12/1988 | Rumberger | |
| 5,058,936 A | 10/1991 | Kapgan et al. | |
| 5,280,675 A | 1/1994 | Orsini, Jr. | |
| 5,405,176 A | 4/1995 | Babel et al. | |
| 5,688,067 A | 11/1997 | Straub | |
| 5,718,131 A | 2/1998 | Bobbitt, III | |
| 6,234,910 B1 * | 5/2001 | Norberg | ................. 464/182 |
| 6,517,126 B1 | 2/2003 | Peterson et al. | |
| 6,652,471 B2 * | 11/2003 | Ehr et al. | |

\* cited by examiner

*Primary Examiner*—Greg Binda
(74) *Attorney, Agent, or Firm*—Ingrassia, Fisher & Lorenz, P.C.

(57) ABSTRACT

A thrust reverser system drive shaft assembly is provided that includes a first shaft and a barrel. The first shaft has an end section and comprises an age-hardenable martinsitic steel alloy material having fracture toughness, stress corrosion cracking resistance, and a tensile strength of at least about 285 ksi during an impact rotational speed of at least about 14,000 rpm. The barrel has a first end, a second end, and a channel formed therethrough. The first end has the first shaft end section disposed therein. The barrel comprises steel alloy material that is different than the first shaft material, has an elongation of at least about 12% in a hardened condition, and is compatible to be welded to the first shaft material.

13 Claims, 5 Drawing Sheets

THRUST REVERSER ACTUATOR SYSTEM FLEX SHAFT ASSEMBLY

TECHNICAL FIELD

The present invention relates to a thrust reverser actuator system and, more particularly, to a flex shaft that may be used in the thrust reverser actuator system.

BACKGROUND

When a jet-powered aircraft lands, the landing gear brakes and imposed aerodynamic drag loads (e.g., flaps, spoilers, etc.) of the aircraft may not, in certain situations, be sufficient to slow the aircraft down in the required amount of runway distance. Thus, jet engines on most aircraft include thrust reversers to enhance the braking of the aircraft. When deployed, a thrust reverser redirects the rearward thrust of the jet engine to a generally forward direction to decelerate the aircraft. Because the jet thrust is directed generally forward, the jet thrust also slows down the aircraft upon landing.

Various thrust reverser designs are commonly known, and the particular design utilized depends, at least in part, on the engine manufacturer, the engine configuration, and the propulsion technology being used. Thrust reverser designs used most prominently with turbofan jet engines fall into three general categories: (1) cascade-type thrust reversers; (2) target-type thrust reversers; and (3) pivot door thrust reversers. Each of these designs employs a different type of moveable thrust reverser component to change the direction of the jet thrust.

Cascade-type thrust reversers are normally used on high-bypass ratio jet engines. This type of thrust reverser is located on the circumference of the engine's midsection and, when deployed, exposes and redirects air flow through a plurality of cascade vanes. The moveable thrust reverser components in the cascade design includes several translating sleeves or cowls ("transcowls") that are deployed to expose the cascade vanes. Target-type reversers, also referred to as clamshell reversers, are typically used with low-bypass ratio jet engines. Target-type thrust reversers use two doors as the moveable thrust reverser components to block the entire jet thrust coming from the rear of the engine. These doors are mounted on the aft portion of the engine and may form the rear part of the engine nacelle. Pivot door thrust reversers may utilize four doors on the engine nacelle as the moveable thrust reverser components. In the deployed position, these doors extend outwardly from the nacelle to redirect the jet thrust.

The primary use of thrust reversers is, as noted above, to enhance the braking of the aircraft, thereby shortening the stopping distance during landing. Hence, thrust reversers are usually deployed during the landing process to slow the aircraft. Thereafter, when the thrust reversers are no longer needed, they are returned to their original, or stowed, position.

The moveable thrust reverser components in each of the above-described designs are moved between the stowed and deployed positions by actuators. Power to drive the actuators may come from one or more drive motors, or from a hydraulic or pneumatic fluid system connected to the actuators, depending on the system design. A drive train may interconnect the actuators (and drive motors, if included) to maintain synchronous movement of the moveable thrust reverser components. The drive train may also include a disk brake assembly that applies a brake torque when the thrust reversers are stowed to prevent inadvertent deployment. Typically, the drive train is coupled to the actuators via a plurality of flexible rotating shafts.

In some configurations, the flexible shafts between each of the actuators and the drive train have different lengths. For example, in some configurations, a shorter flexible shaft may be coupled proximate the disk brake assembly and may receive disk brake rotational energy experienced during cowl deployment and impact with the deployment stops. Because of the shaft's short length, the resulting load received by the shaft may be relatively high. This increased load may increase the wear experienced by the flexible shaft. As a result, the flexible shaft may need to undergo more frequent maintenance or replacement.

Hence, there is a need for a flexible shaft that improves on one or more of the above-noted drawbacks. Namely, a flexible shaft that is configured to transfer torque effectively, decrease frequency of maintenance and/or replacement. The present invention addresses one or more of these needs.

BRIEF SUMMARY

The present invention provides methods and apparatus for use in a thrust reverser system.

In one embodiment, and by way of example only, a thrust reverser system drive shaft assembly is provided that includes a shaft and a barrel. The shaft has an end section and comprises an age-hardenable martinsitic steel alloy material having fracture toughness, stress corrosion cracking resistance, and a tensile strength of at least about 285 ksi during an impact rotational speed of at least about 14,000 rpm. The barrel has an inlet, an outlet, and channel formed therebetween. The inlet has at least a portion of the shaft end section disposed therein. The barrel comprises steel alloy material that is different than the shaft material, has an elongation of at least about 12% in a hardened condition, and is compatible to be welded to the shaft material In another embodiment, and by way of example only, a flex shaft assembly is provided comprising a drive shaft, a flexible shaft, and a barrel. The drive shaft has an end, and comprises an age-hardenable martinsitic steel alloy material having fracture toughness, stress corrosion cracking resistance, and a tensile strength of at least about 285 ksi during an impact rotational speed of at least about 14,000 rpm. The flexible shaft has an end. The barrel is coupled to the drive shaft and the flexible shaft and has an inlet, an outlet, and a channel formed therebetween. The barrel inlet has at least a portion of the drive shaft end disposed therein and the barrel outlet has at least a portion of the flexible shaft end disposed therein. The barrel comprises steel alloy material that is different than the drive shaft material, has an elongation of at least about 12% in a hardened condition, and is compatible to be welded to the drive shaft material.

In still another embodiment, and by way of example only, a method is provided for manufacturing a flex shaft. The method includes the steps of inserting an end of a first shaft into a channel formed through a barrel, the first shaft comprising an age-hardenable martinsitic steel alloy material having fracture toughness, stress corrosion cracking resistance, and a tensile strength of at least about 285 ksi during an impact rotational speed of at least about 14,000 rpm and the barrel comprising steel alloy material that is different than the drive section material, has an elongation of at least about 12% in a hardened condition, and is compatible to be welded to the first shaft material, welding the first shaft and the barrel to one another, and swaging the barrel around at least a portion of a second shaft.

Other independent features and advantages of the preferred assemblies and methods will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the described embodiment is not limited to use in conjunction with a specific thrust reverser system design. Thus, although the description is explicitly directed toward an embodiment that is implemented in a cascade-type thrust reverser system, in which transcowls are used as the moveable thrust reverser component, it should be appreciated that it can be implemented in other system designs within which a high strength is needed between two coupled shafts, including those described above and those known now or hereafter in the art.

Figure 1:
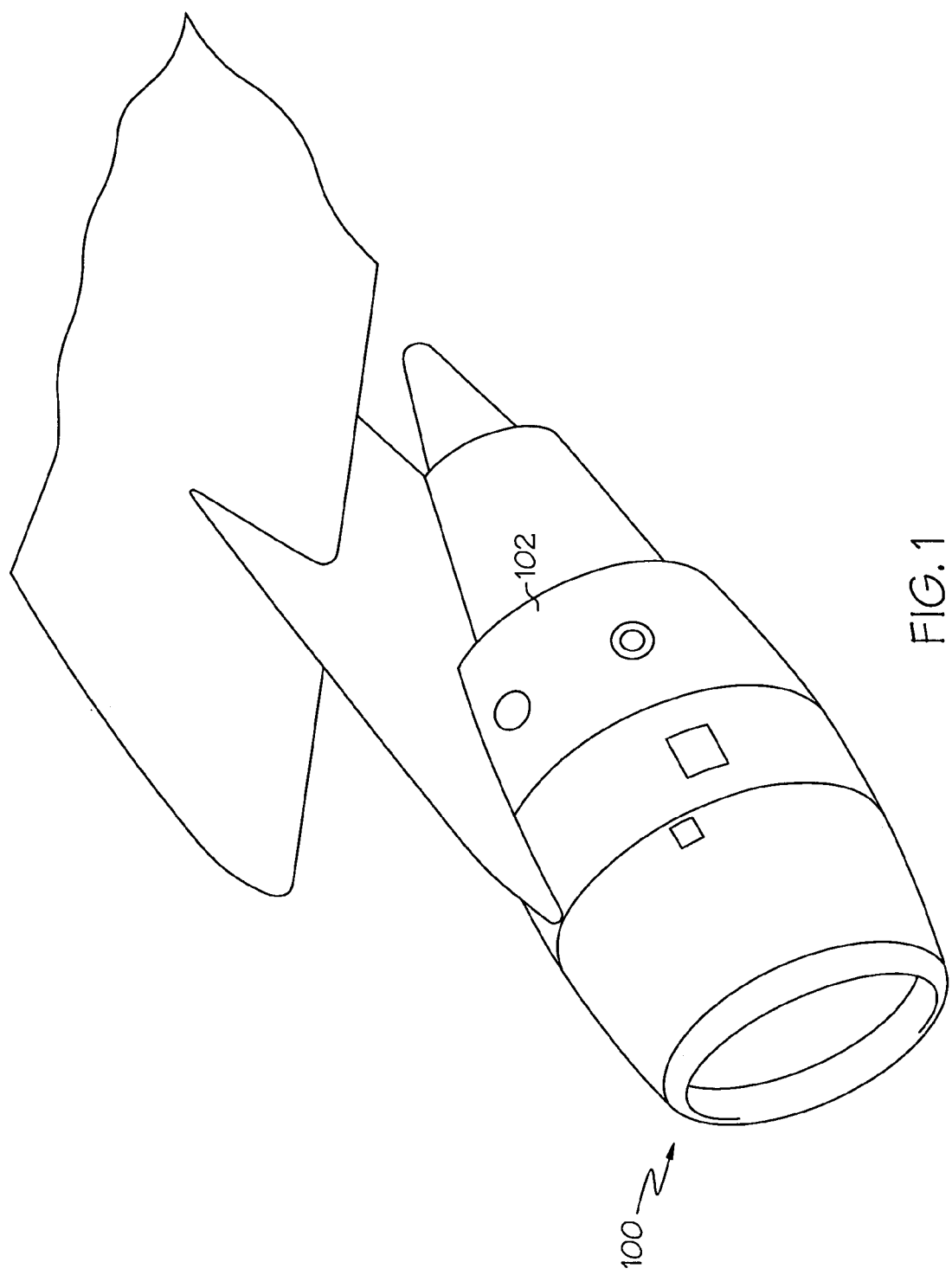
FIG. 1 is a perspective view of an aircraft engine.

Turning now to the description, and with reference first to FIG. 1, a perspective view of portions of an aircraft jet engine fan case 100 that incorporates a cascade-type thrust reverser is depicted. The engine fan case 100 includes a pair of semicircular transcowls 102 that are positioned circumferentially on the outside of the fan case 100.

Figure 2:
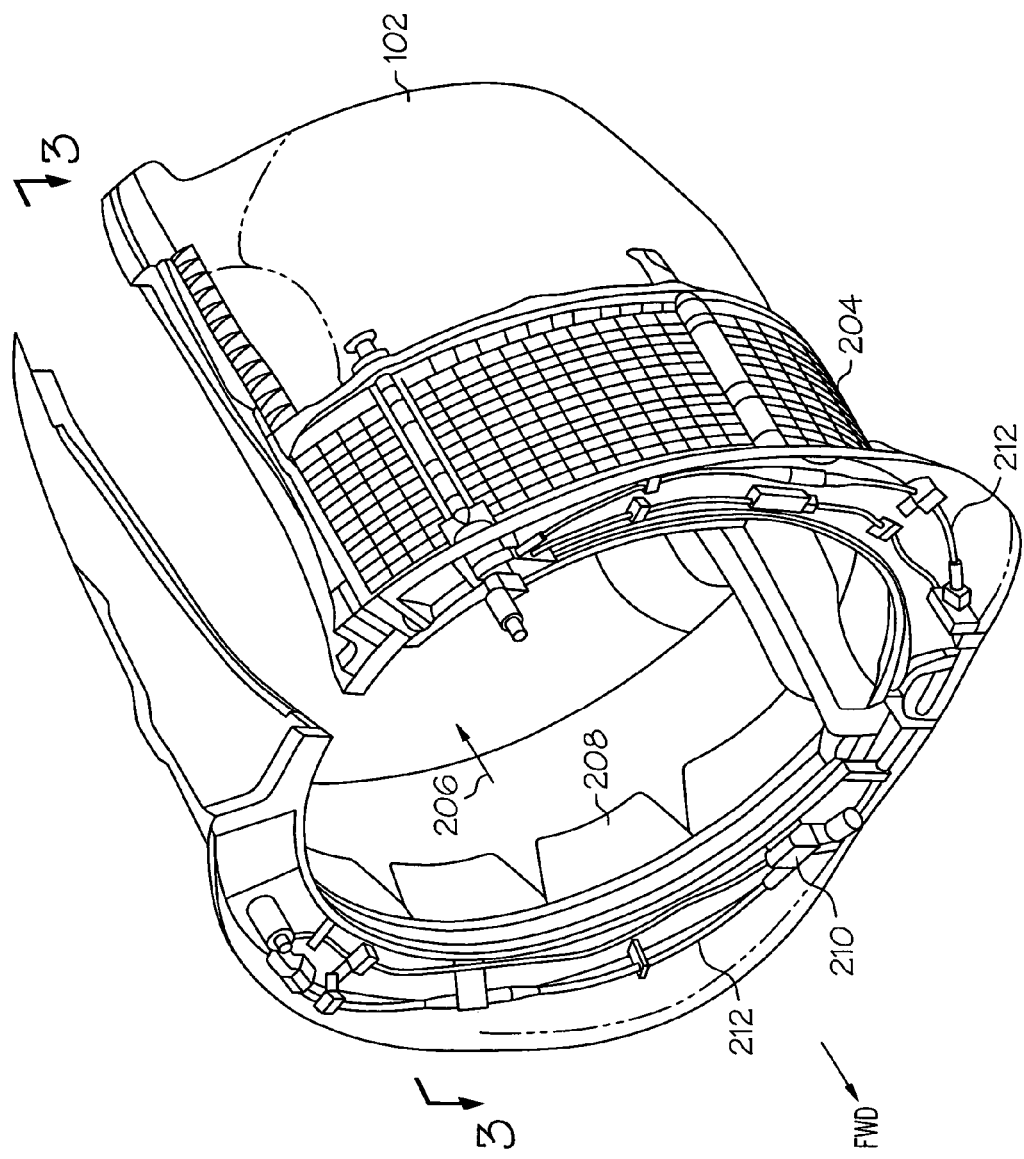
FIG. 2 is a perspective view of portions of an engine fan cowl and thrust reverser system utilized with the engine of FIG. 1.
Figure 3:
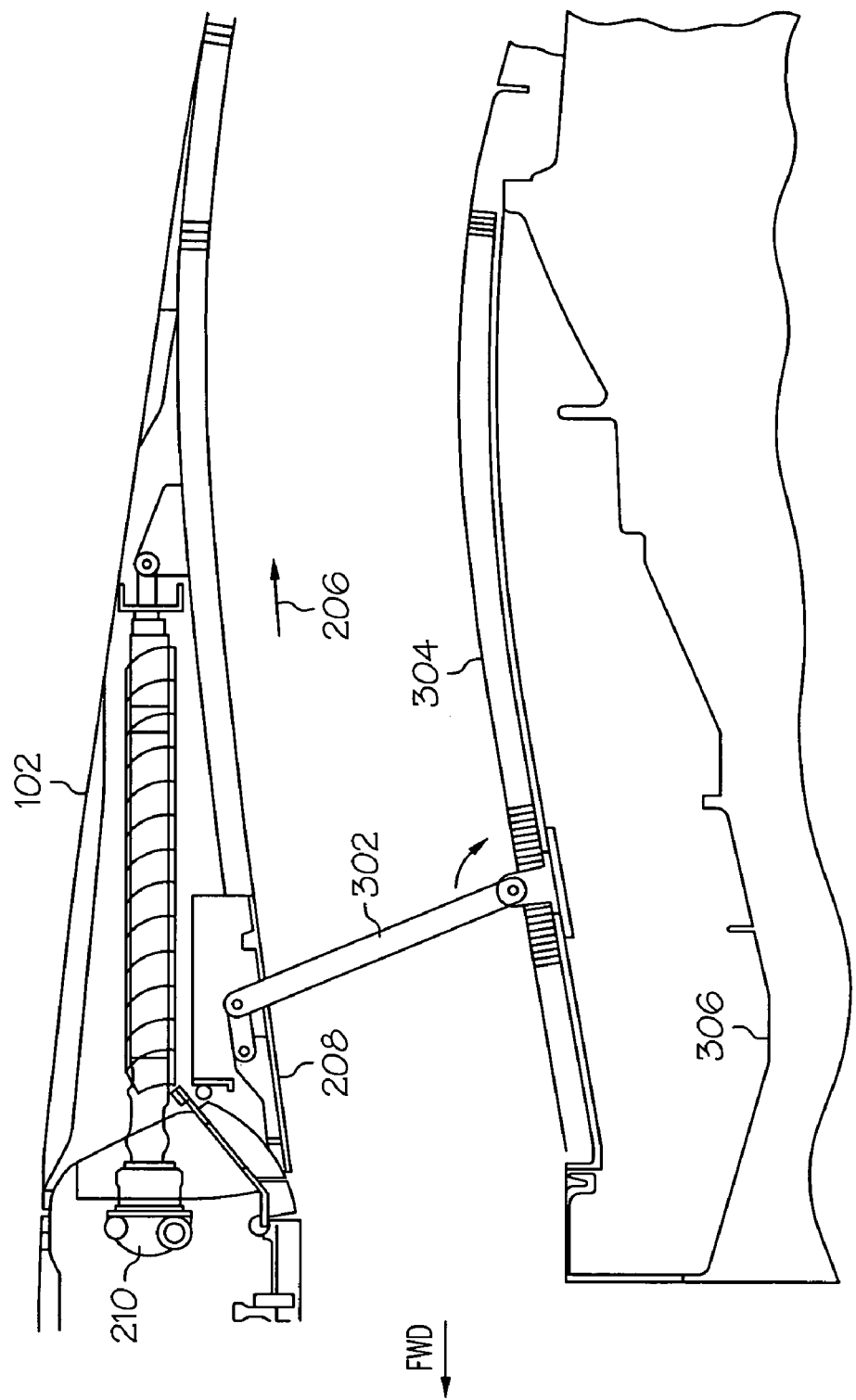
FIG. 3 is a partial cross section view taken along line 3-3 of FIG. 2.
Figure 4:
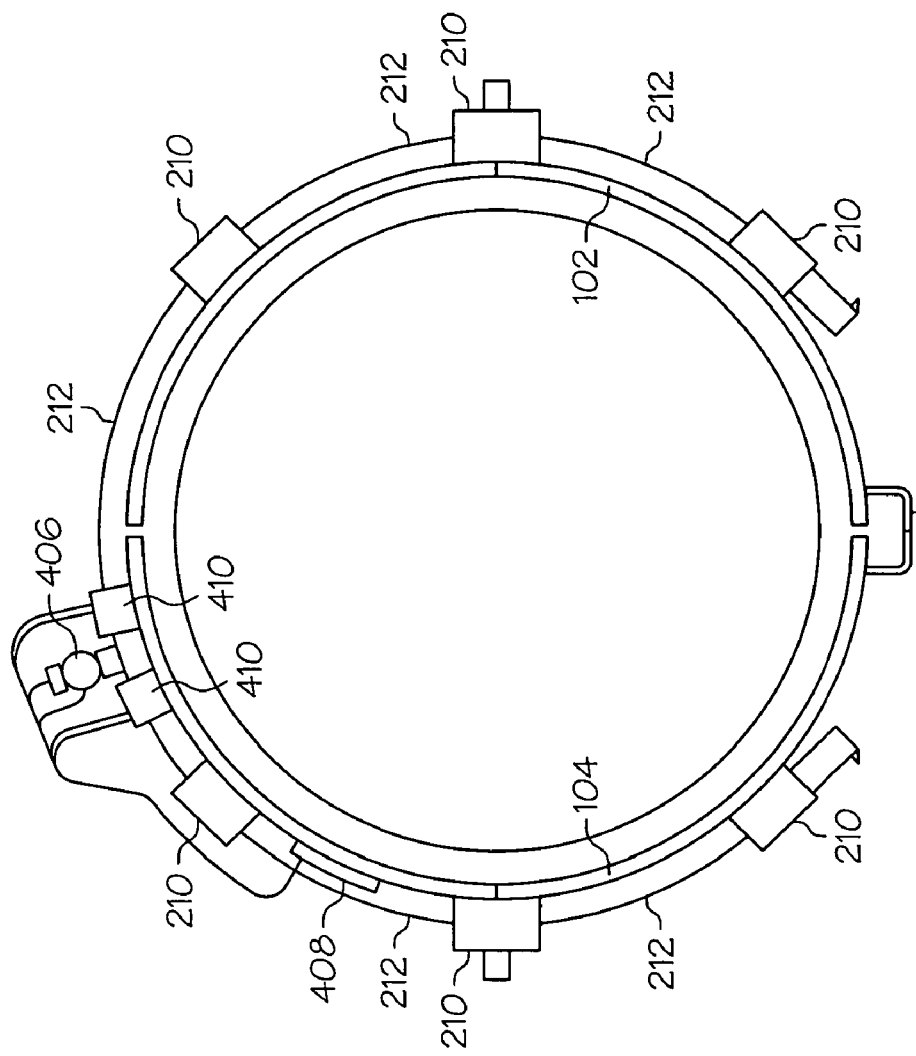
FIG. 4 is a simplified end view of a first embodiment of a thrust reverser actuation system that may incorporate the brake assembly of the present invention.

As shown more particularly in FIGS. 2, 3 and 4, the transcowls 102 cover a plurality of cascade vanes 204, which are positioned between the transcowls 102 and a bypass air flow path 206. A mechanical link 405, such as a pin or latch, may couple the transcowls 102 together to maintain the transcowls 102 in correct alignment on non-illustrated guides on which the transcowls 102 translate. A series of blocker doors 208 are mechanically linked to the transcowls 102 via a drag link 302 that is rotatably connected to an outer wall 304 that surrounds the engine case 306. In the stowed position, the blocker doors 208 form a portion of the outer wall 304 and are therefore oriented parallel to a bypass air flow path 206. When the thrust reversers are commanded to deploy, the transcowls 102 are translated aft, causing the blocker doors 208 to rotate into a deployed position, such that the bypass air flow path 206 is blocked. This also exposes the cascade vanes 204 and redirects the bypass air flow out the cascade vanes 204. The re-direction of the bypass air flow in a forward direction creates a reverse thrust and, thus, works to slow the airplane.

A plurality of actuators 210 are individually coupled to the transcowls 102. In one exemplary embodiment, half of the actuators 210 are coupled to one of the transcowls 102, and the other half are coupled to another transcowl 104. It is noted that some or all of the actuators 210 may include locks, some or all of which may include position sensors. In addition, the transcowls 102 and 104 also may each include locks. It will be appreciated that the actuators 210 may be any one of numerous types of actuators. However, in this embodiment the actuators 210 are ballscrew actuators. Moreover, the number and arrangement of actuators 210 is not limited to what is depicted in FIGS. 2 and 4, but could include other numbers of actuators 210 as well. The number and arrangement of actuators is selected to meet the specific design requirements of the system.

The actuators 210 are interconnected via a plurality of drive mechanisms 212, each of which, in the particular depicted embodiment, comprises a flexible shaft. The flexible shafts 212 ensure that the actuators 210, and thus all points of each transcowl 102, as well as both transcowls 102, 104 move in a substantially synchronized manner. For example, when one transcowl 102 is moved, the other transcowl 104 is moved a like distance at substantially the same time. Other drive or synchronization mechanisms that may be used include electrical synchronization or open loop synchronization, or any other mechanism or design that transfers power between the actuators 210.

As shown more particularly in FIG. 4, which depicts one particular embodiment, one or more drive units 406, such as a motor, are coupled to the actuators 210 via an associated flexible shaft 212. The drive unit 406 may be an electric (including any one of the various DC or AC motor designs known in the art), a hydraulic, or a pneumatic motor. Moreover, though not explicitly depicted, the drive unit 406 may include a locking mechanism. In the exemplary embodiment depicted in FIG. 4, a single drive unit 406 with dual outputs is used. It will be appreciated, however, that two drive units, one associated with each of the first and second transcowls 102, may also be used. This particular alternate embodiment is disclosed in U.S. Pat. No. 6,598,386 which is commonly assigned with the present application, and which is hereby incorporated by reference. It will be additionally appreciated that the present invention may encompass more than the number of drive units explicitly depicted in each embodiment, as required to meet the specific design requirements of a particular thrust reverser system.

Each drive unit 406 is preferably controlled by a control circuit 408 that receives commands from a non-illustrated engine control system such as, for example, a FADEC (full authority digital engine control) system, and provides appropriate activation signals to the drive unit 406 in response to the received commands. In turn, the drive unit 406 supplies a drive force to the actuators 210 via the brake assemblies 410 and the flexible shafts 212. As a result, the actuators 210 cause the transcowls 102 to translate between the stowed and deployed positions.

Figure 5:
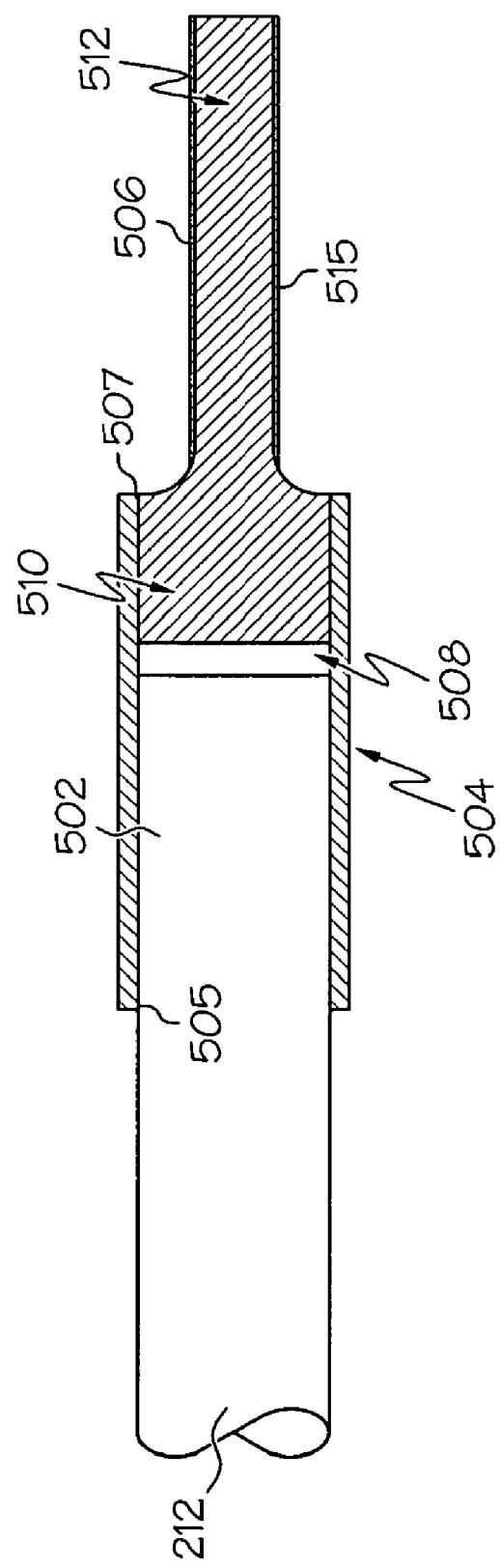
FIG. 5 is a partial cross section view of a section of an exemplary flexible shaft that may be implemented into the thrust reverser actuation system depicted in FIGS. 2-4.

Turning to FIG. 5, a close up view of a section of one of the flexible shafts 212 is shown. The flexible shaft 212 has an end 502 that is coupled to a drive shaft 506 via a barrel 504. It will be appreciated that the flexible shaft 212 may be made of any suitable material conventionally employed for constructing flexible shafts. The drive shaft 506 is configured to couple to the actuator 210 and to couple the flexible shaft 212 to the brake assembly 410 and, in this regard, is constructed of material having relatively high strength. In one exemplary embodiment, the drive shaft 506 is constructed of an age-hardenable martinsitic steel alloy material having fracture toughness, stress-corrosion cracking resistance, and a tensile strength of at least about 285 ksi during an impact rotational speed of at least about 14,000 rpm. Examples of suitable materials include, but are not limited to, Aermet® 100, which is available through Carpenter Technology Corporation of Reading, Pa. and consists essentially of, in weight percent, about 0.2-0.33 C, about 2-4 Cr, about 10.5-15.0 Ni, about 0.75-1.75 Mo, about 8-17 Co, and balance Fe, or any material disclosed in U.S. Pat. No. 5,087,415, which is incorporated herein in its entirety by reference. In some embodiments, the drive shaft 506 may be exposed to a corrosive environment; thus, a non-corrosive coating 515, such as chrome, paint, cadmium, or other suitable treatment may be applied to at least a portion of an outer surface of drive shaft 505. Although the exemplary embodiment depicts the drive shaft 506 as a solid piece of material, it will be appreciated that the drive shaft 506 may be a formed as a fully or partially hollow tube. In such case, at least a portion of the hollow tube, for example, an outer surface, is preferably coated with the non-corrosive coating 515.

The drive shaft 506 has an end section 510 and an elongated section 512. The end section 510 preferably has a cross section shape and size that matches the cross section of the flexible shaft 212 so that the two may be more easily coupled to one another. For example, the cross section shape may be circular, square, serrated, or splined. The elongated section 512 preferably has the same cross-section shape as the end section 510, though it may have a different cross-section shape.

As briefly mentioned above, the barrel 504 couples the flexible shaft 212 and the drive shaft 506 to one another. Thus, the barrel 504 is configured to have high strength, toughness, the ability to withstand torquing from either the flexible shaft 212 or the drive shaft 506, and an elongation of at least about 12% in a hardened condition. Additionally, the barrel 504 is preferably capable of being welded to the drive shaft 506 material. Suitable materials for constructing the barrel 504 include, but are not limited to, precision S/B precipitation hardness steels, such as 13-8 PH, 15-5 PH, 17-4 PH, 17-7 PH, and other materials. In one embodiment, the barrel 504 material comprises 15-5PH steel and the drive shaft 506 material comprises Aermet® 100. When the barrel 504 and drive shaft 506 materials are welded together, a high strength bond is formed between the barrel 504 and drive shaft 506.

The barrel 504 includes an inlet 505, an outlet 507, and a channel 508 that is formed therebetween. The inlet 505 is preferably appropriately sized to receive the flexible shaft end 502 and the outlet 507 is preferably sized to receive the drive shaft end section 510. At least a portion of the barrel 504 is configured to provide an interference fit with the drive shaft end section 510 when the end section 510 is at least partially disposed therein. Although the channel 508 is illustrated as having a uniform shape and size, it may, alternatively, include two sections where one section is configured to receive the flexible shaft end 502 and the other section is configured to receive the drive shaft end section 510.

The flexible shaft 212/drive shaft 506 assembly may be assembled in any one of numerous manners. In one exemplary embodiment, first, the drive shaft end section 510 is inserted into one end of the barrel channel 508. Then, the end section 510 and barrel 504 are welded to one another. Any suitable welding technique may be employed, including, but not limited to electron beam welding, inertia welding, and friction welding. Next, the flexible shaft end 502 is inserted into the open end of the barrel channel 508 and the barrel 504 is swaged around the flexible shaft 212.

It will be appreciated that, depending on the material used for the construction of either the barrel 504 or drive shaft 506, one or both of the barrel 504 and/or drive shaft 506 may need to be heat-treated at a predetermined temperature at some point during the assembly process to achieve a desired predetermined hardness.

There has now been provided a method and apparatus that is configured to transfer torque effectively, decrease frequency of maintenance and/or replacement.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A thrust reverser system drive shaft assembly comprising:
   a first shaft having an end section, the first shaft comprising a first material comprising an age-hardenable martinsitic steel alloy material having fracture toughness, stress corrosion cracking resistance, and a tensile strength of at least about 285 ksi during an impact rotational speed of at least about 14,000 rpm; and
   a barrel having an inlet, an outlet, and channel formed therebetween, the outlet having at least a portion of the first shaft end section disposed therein and welded thereto, the barrel comprising a second material that is different than the first material, the second material comprising a precision hardness stainless steel having an elongation of at least about 12% in a hardened condition.

2. The assembly of claim 1, wherein the first material consists essentially of, in weight percent, about 0.2-0.33 C, about 2-4 Cr, about 10.5-15 Ni, about 0.75-1.75 Mo, about 8-17 Co, and balance essentially Fe.

3. The assembly of claim 1, wherein the first shaft has a square cross-section.

4. The assembly of claim 1, wherein the first shaft has a circular cross-section.

5. The assembly of claim 1, further comprising:
   a second shaft at least partially disposed within the barrel inlet.

6. The assembly of claim 1, wherein:
   the first shaft further includes an elongated section; and
   the cross-section of the elongated section is different than the cross-section of the first shaft end section.

7. The assembly of claim 1, wherein the first shaft includes a non-corrosive coating.

8. A flex shaft assembly comprising:
   a drive shaft having an end, the drive shaft comprising a first material comprising an age-hardenable martinsitic steel alloy material having fracture toughness, stress corrosion cracking resistance, and a tensile strength of at least about 285 ksi during an impact rotational speed of at least about 14,000 rpm;
   a flexible shaft having an end; and
   a barrel coupled to the drive shaft and the flexible shaft, the barrel having an inlet, an outlet, and a channel formed therebetween, the barrel outlet having at least a portion of the drive shaft end disposed therein and welded thereto and the barrel inlet having at least a portion of the flexible shaft end disposed therein, the barrel comprising a second material that is different than the first material, the second material comprising a precision hardness stainless steel having an elongation of at least about 12% in a hardened condition.

9. The assembly of claim 8, wherein the drive shaft material consists essentially of, in weight percent, about 0.2-0.33 C, about 2-4 Cr, about 10.5-15 Ni, about 0.75-1.75 Mo, about 8-17 Co, and balance Fe.

10. The assembly of claim 8, wherein:
the first shaft further includes an elongated section; and
the cross section of the elongated section is different than the cross section of the end section.

11. The assembly of claim 8, wherein the first shaft includes a non-corrosive coating.

12. The assembly of claim 8, further comprising:
an actuator coupled to the drive shaft; and
a drive unit coupled to the actuator adapted to supply a drive force thereto.

13. The assembly of claim 12, further comprising:
a transcowl coupled to the actuator and adapted to translate between a stowed position and a deployed position, in response to the actuator.

* * * * *